US011932010B2

(12) United States Patent
Yanna

(10) Patent No.: US 11,932,010 B2
(45) Date of Patent: Mar. 19, 2024

(54) PLASTIC CARD PRINTING SYSTEMS WITH TEMPERATURE AND PIXEL DENSITY COMPENSATION

(71) Applicant: Entrust Corporation, Shakopee, MN (US)

(72) Inventor: Ethan Yanna, Shakopee, MN (US)

(73) Assignee: Entrust Corporation, Shakopee, MN (US)

(*) Notice: Subject to any disclaimer, the term of this patent is extended or adjusted under 35 U.S.C. 154(b) by 0 days.

(21) Appl. No.: 17/452,665

(22) Filed: Oct. 28, 2021

(65) Prior Publication Data

US 2022/0126610 A1 Apr. 28, 2022

Related U.S. Application Data

(60) Provisional application No. 63/106,667, filed on Oct. 28, 2020.

(51) Int. Cl.

*B41J 13/12* (2006.01)
*B41J 2/325* (2006.01)
*B41J 2/365* (2006.01)

(52) U.S. Cl.

CPC ............... *B41J 13/12* (2013.01); *B41J 2/325* (2013.01); *B41J 2/365* (2013.01)

(58) Field of Classification Search

CPC ... B41J 13/12; B41J 2/365; B41J 2/325; B41J 2/315; B41J 2/32; B41F 16/00; B41F 16/0006

See application file for complete search history.

(56) References Cited

U.S. PATENT DOCUMENTS

| | | | |
|---|---|---|---|
| 4,825,054 | A | 4/1989 | Rust et al. |
| 4,995,501 | A | 2/1991 | Lundstrom et al. |
| 5,087,923 | A | 2/1992 | Bruch |
| 5,266,781 | A | 11/1993 | Warwick et al. |
| 5,450,099 | A | 9/1995 | Stephenson et al. |
| 5,796,420 | A | 8/1998 | Kaerts et al. |
| 5,837,991 | A | 11/1998 | LaManna et al. |
| 6,131,817 | A | 10/2000 | Miller |
| 6,384,854 | B1 | 5/2002 | Ibs et al. |
| 6,783,067 | B2 | 8/2004 | Kreuter et al. |
| 6,902,107 | B2 | 6/2005 | Shay et al. |
| 7,398,972 | B2 | 7/2008 | Schuller et al. |
| 7,434,728 | B2 | 10/2008 | Paulson et al. |

(Continued)

FOREIGN PATENT DOCUMENTS

JP 2003-237041 A1 8/2003

OTHER PUBLICATIONS

International Search Report and Written Opinion; International Patent Application No. PCT/IB2021/059995, dated Feb. 9, 2022 (10 pages).

*Primary Examiner* — Kristal Feggins
(74) *Attorney, Agent, or Firm* — Merchant & Gould P.C.

(57) ABSTRACT

Thermal printing on plastic cards where the energization of each individually energizable heating element of a thermal printhead is adjusted based on a temperature of the thermal printhead and a density of the pixel to be printed. For each pixel, the printhead temperature and the pixel density of a pixel to be printed are used to adjust the strobe pulse length that energizes the heating element to print that pixel. By compensating for both printhead temperature and pixel density, a tighter tolerance of the resulting printed densities is achieved.

20 Claims, 4 Drawing Sheets

(56) References Cited

U.S. PATENT DOCUMENTS

| | | | |
|---|---|---|---|
| 2002/0191066 | A1 | 12/2002 | Bouchard et al. |
| 2003/0156147 | A1 | 8/2003 | Misumi |
| 2007/0187870 | A1 | 8/2007 | Lundstrom et al. |

PLASTIC CARD PRINTING SYSTEMS WITH TEMPERATURE AND PIXEL DENSITY COMPENSATION

FIELD

This technical disclosure relates to thermal printing on plastic cards using a thermal printhead and compensating for both the printhead temperature and the density of each pixel that is printed.

BACKGROUND

Printing on plastic cards using a thermal printhead is known. The thermal printhead includes a plurality of individually energizable heating elements that are individually energized based on a determined strobe pulse length for each heating element. An example of driving heating elements in a thermal printhead based on strobe pulse length is disclosed in U.S. Pat. No. 5,087,923.

SUMMARY

Thermal printing on plastic cards is described where the energization of each individually energizable heating element of a thermal printhead is adjusted based on a temperature of the thermal printhead and a density of the pixel to be printed. For each pixel, the printhead temperature and the pixel density of a pixel to be printed are used to adjust the strobe pulse length that energizes the heating element to print that pixel. By compensating for both printhead temperature and pixel density, a tighter tolerance of the resulting printed densities is achieved.

The thermal printing described herein can apply to direct-to-card thermal printing where the printing occurs directly on the plastic card, and to re-transfer printing where the printing initially takes place on a transferrable substrate, and the transferrable substrate with the printing thereon is then laminated onto the plastic card.

Plastic cards as used herein include, but are not limited to, financial (e.g., credit, debit, or the like) cards, access cards, driver's licenses, national identification cards, business identification cards, gift cards, and other plastic cards. In some embodiments, the techniques described herein can be used to print on one or more pages of a passport such as a front cover or a rear cover of the passport, or an internal page (for example a plastic page) of the passport.

The processing of the data to compensate for both the printhead temperature and the pixel density preferably occurs in a printer controller that is in direct or indirect communication with the thermal printhead. The printer controller may also be referred to as being associated with the thermal printhead. In one embodiment, the printer controller be located in the plastic card printer that includes the thermal printhead. In another embodiment, the printer controller can be located remote from (i.e. physically separate from) the plastic card printer.

The printer controller includes one or more data processing devices that have a sufficient data processing speed to maintain a desired print speed of the thermal printhead. In one embodiment, the one or more data processing devices comprises at least one field programmable gate array (FPGA). However, the data processing device(s) can be single core or multi-core processors or other data processing devices. In one embodiment, the thermal printhead can have a print speed from about 0.38 inches per second up to about 1.75 inches per second. In one embodiment, the print speed can be about 1.55 inches per second. However, different print speeds are possible while still compensating for both the printhead temperature and the pixel density as described herein.

In one embodiment, a plastic card printing system can include a print ribbon supply and a print ribbon take-up, a multicolor print ribbon supplied from the print ribbon supply and taken up on the print ribbon take-up, where the multicolor print ribbon includes a plurality of dye color panels, and a thermal printhead having a plurality of individually energizable heating elements. In addition, the plastic card printing system includes a printer controller that is in communication with the thermal printhead and generates data to control the energization of the individually energizable heating elements to print an image to be applied to the plastic card. The printer controller can be part of, or separate from, a plastic card printer that includes the thermal printhead. For each pixel to be printed, the printer controller generates data to control the energization of the individually energizable heating elements based on a temperature of the thermal printhead and a density of the pixel.

In another embodiment, a plastic card printing system can include a print ribbon supply and a print ribbon take-up, a multicolor print ribbon supplied from the print ribbon supply and taken up on the print ribbon take-up, where the multicolor print ribbon includes a plurality of dye color panels, and a thermal printhead having a plurality of individually energizable heating elements. In addition, the plastic card printing system includes a printer controller in communication with the thermal printhead and that generates data to control the energization of the individually energizable heating elements to print an image to be applied to the plastic card. The printer controller includes at least one FPGA having a data processing speed of at least about 96 MHz. The printer controller can be part of, or separate from, a plastic card printer that includes the thermal printhead.

In another embodiment, a plastic card printing system that prints on a plastic card can include a print ribbon supply and a print ribbon take-up, a multicolor print ribbon supplied from the print ribbon supply and taken up on the print ribbon take-up, where the multicolor print ribbon includes a plurality of dye color panels, and a thermal printhead having a plurality of individually energizable heating elements. In addition, a printer controller is in communication with the thermal printhead and that generates data to control the energization of the individually energizable heating elements to print an image to be applied to the plastic card. The printer controller implements a compensation scheme that results in a pixel density error of 8% or less across all pixel densities. The printer controller can be part of, or separate from, a plastic card printer that includes the thermal printhead.

In still another embodiment, a method of direct-to-card thermal printing on a plastic card in a plastic card printing system is described. The plastic card printing system includes a thermal printhead with a plurality of individually energizable heating elements, and a multicolor print ribbon that includes a plurality of dye color panels. The method includes receiving a print request for printing on the plastic card in the plastic card printing system using the thermal printhead and the multicolor print ribbon, where the print request includes print data. The print data is processed and, for each pixel to be printed, strobe pulse length data is generated that is used to energize the individually energizable heating elements, where the strobe pulse length data for each pixel factors in a temperature of the thermal printhead and a density of the pixel. The generated strobe pulse length data for each pixel is then used to energize the individually energizable heating elements to transfer dye from the dye color panels and print on the plastic card. The processing of the data and generation of the strobe pulse length data can occur in a printer controller, included within the card printer having the thermal printhead or separate from the card printer, that is in communication with the thermal printhead.

DRAWINGS

DETAILED DESCRIPTION

Figure 1:
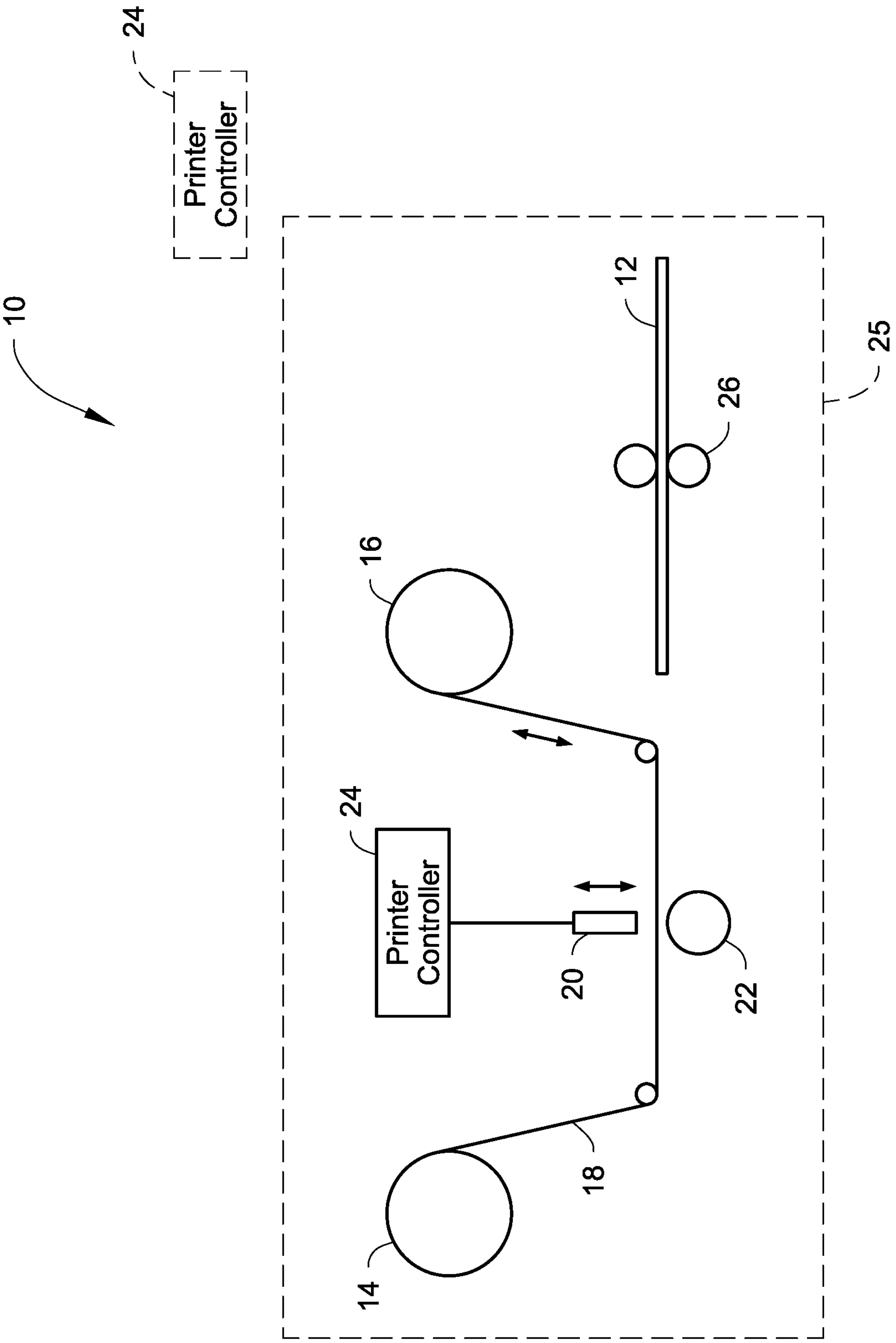
FIG. 1 illustrates an example of a plastic card printing system that implements the compensation described herein.

Referring to FIG. 1, an example of a plastic card printing system 10 is illustrated. In this example, the system 10 is configured to perform direct-to-card thermal printing on a plastic card 12. The system 10 includes a print ribbon supply 14, a print ribbon take-up 16, a multicolor print ribbon 18, a thermal printhead 20, a platen 22 located opposite the printhead 20, and a printer controller 24. The print ribbon supply 14, the print ribbon take-up 16, the multicolor print ribbon 18, the thermal printhead 20, and the platen 22 can be considered part of a plastic card printer and disposed within a housing 25 of the plastic card printer.

The print ribbon 18 can be any multicolor print ribbon known in the art of plastic card printing. The print ribbon 18 is supplied from the print ribbon supply 14 and is taken up on the print ribbon take-up 16 after use. The print ribbon 18 includes a plurality of color panels disposed in a repeating sequence. For example, the print ribbon 18 can be a YMCK ribbon with multiple sequences of yellow (Y), magenta (M), cyan (C) and black (K) panels as is well known in the art. The YMC panels are typically dye material, while the K panel is a pigment material. In some embodiments the print ribbon 18 can include one or more additional panels associated with each sequence of color panels, including, but not limited to, panels of topcoat material (often designated as a YMCKT ribbon) and/or overlay material (often designated as a YMCKO ribbon).

The thermal printhead 20 can be any thermal printhead known in the art of plastic card printing. As would be well understood by a person of ordinary skill in the art, the thermal printhead 20 includes a plurality of individually energizable heating elements (not shown) each of which is selectively energizable by an electronic strobe pulse which heats the corresponding heating element to transfer color material from one of the panels of the print ribbon 18 to the plastic card 12. As depicted in FIG. 1, the thermal printhead 20 can be moved toward the platen 22 to bring the printhead 20 into position during printing in a print pass, and moved away from the platen 22 when not printing to reposition the card 12 for a next print pass.

A mechanical card transport mechanism, such as one or more pairs of transport rollers 26, transport the card 12 in the printing system 10. The card transport mechanism is preferably reversible to permit forward and reverse transport of the card 12 to permit implementation of multiple print passes past the printhead 20. Mechanical card transport mechanism(s) for transporting plastic cards in plastic card printing systems are well known in the art. Additional examples of card transport mechanisms that could be used are known in the art and include, but are not limited to, transport belts (with tabs and/or without tabs), vacuum transport mechanisms, transport carriages, and the like and combinations thereof. Card transport mechanisms are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of card transport mechanisms that could be used, as well as the construction and operation of such card transport mechanisms.

The printer controller 24 communicates directly or indirectly with the thermal printhead 20. The printer controller 24 can be part of the plastic card printer and located within the housing 25 as indicated in solid lines in FIG. 1, or the printer controller 24 can be remote from (i.e. physically separate from) the plastic card printer and located outside the housing 25 as indicated in broken lines in FIG. 1. The printer controller 24 processes print data and generates data in the form of strobe pulses to control the energization of the individually energizable heating elements of the thermal printhead 20 to generate the printing on the card 12. The printer controller 24 may also control driving of the ribbon supply 14 and/or the print ribbon take-up 16 during printing, control the movements of the thermal printhead 20 during printing, and/or control operation of the transport rollers 26 during printing. Alternatively, the driving of the ribbon supply 14 and/or the print ribbon take-up 16, the movements of the thermal printhead 20, and/or the operation of the transport rollers 26 may be controlled by a separate control mechanism of the printing system 10 either within the plastic card printer or remote from the plastic card printer. For example, in some embodiments, when the printer controller is remote from the plastic card printer, only the portion of the printer controller that processes print data and generates the strobe pulses to control the energization of the individually energizable heating elements of the thermal printhead 20 may be remote or outside of the plastic card printer. Other functions of the printer controller 24, such as control of the card transport mechanism(s), control of movement of the print ribbon 18 and the movement of the thermal printhead 20, and the like, may be on the plastic card printer.

Figure 2:
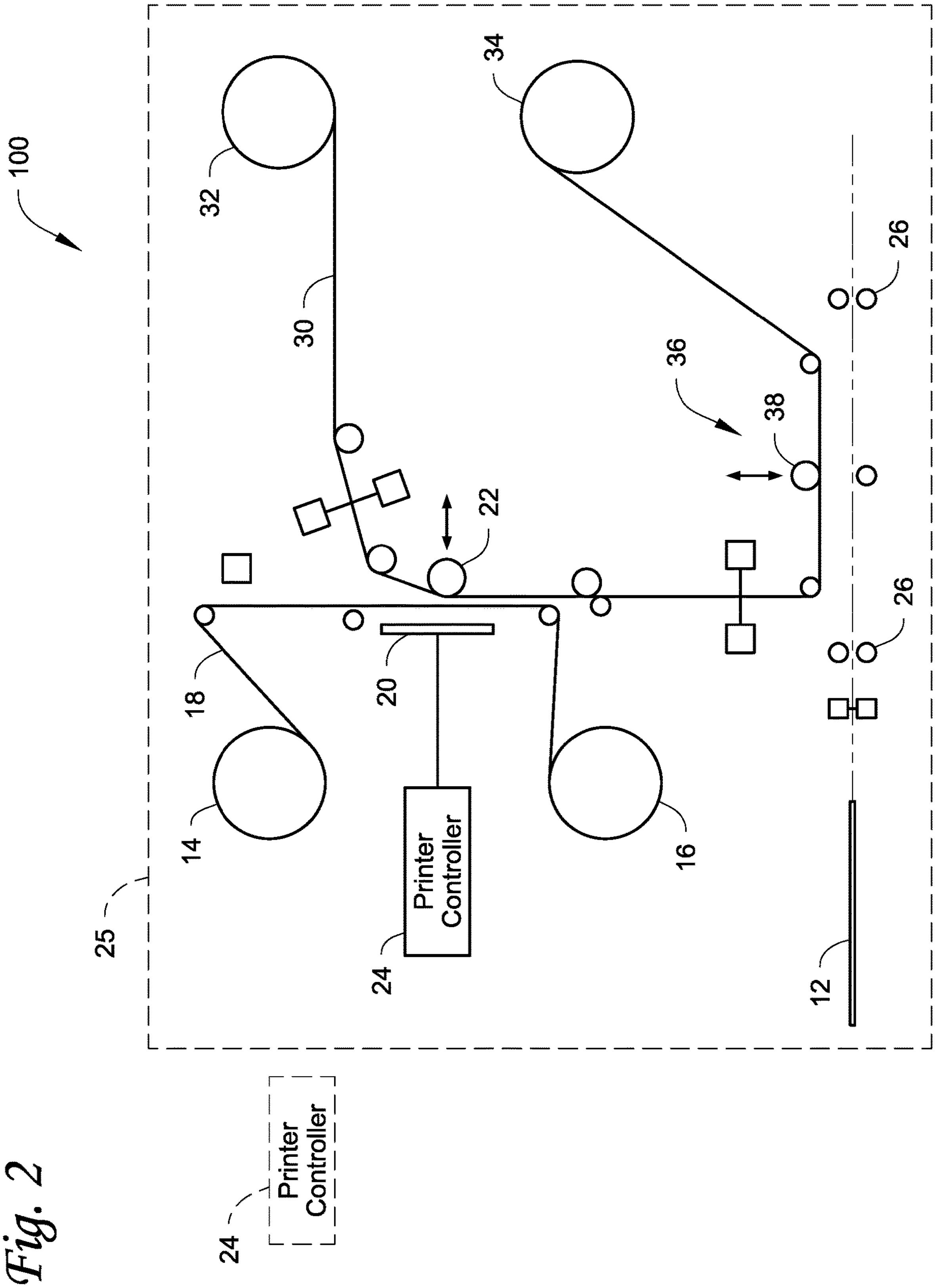
FIG. 2 illustrates another example of a plastic card printing system that implements the compensation described herein.

FIG. 2 illustrates another example of a plastic card printing system 100. In this example, the system 100 is configured to perform retransfer printing on the plastic card 12. The general construction of retransfer card printers is well known in the art. In this example, elements that are same as or similar to elements in the system 10 in FIG. 1 are referenced using the same reference numerals. The system 100 includes the print ribbon supply 14, the print ribbon take-up 16, the multicolor print ribbon 18, the thermal printhead 20, the platen 22, and the printer controller 24.

In the system 100, instead of printing directly on the plastic card 12, the printing is initially performed on a transferrable material of a retransfer ribbon 30. The retransfer ribbon 30 is supplied from a retransfer ribbon supply 32 and used retransfer ribbon is wound up on retransfer ribbon take-up 34. The retransfer ribbon 30 follows a path past the printhead 20 where printing takes place on the transferrable material. The retransfer ribbon 30 with the printing thereon is then advanced to a transfer station 36 where the transferrable material with the printing thereon is transferred from the retransfer ribbon 30 and laminated onto the card 12 using a heated transfer roller 38. After transferring the transferrable material with the printing, the used retransfer ribbon 30 is wound onto the take-up 34.

The printer controller 24 processes print data and generates data in the form of strobe pulses to control the energization of the individually energizable heating elements of the thermal printhead 20 to generate the printing on the retransfer ribbon 30. The printer controller 24 may also control other operations of the printing system 100, such as driving of the ribbon supply 14 and/or the print ribbon take-up 16, the movements of the thermal printhead 20, operation of the transport rollers 26, operation of the supply 32 and the take-up 34, the transfer roller 38, etc. Alternatively, the other operations of the printing system 100 may be controlled by a control mechanism separate from the printer controller 24.

In each of the printing systems 10, 100, the printer controller 24 is programmed to process the data to compensate for both the printhead temperature and the density of the pixel to be printed. The printer controller 24 adjusts the strobe pulse lengths used to energize the heating elements of the thermal printhead for every shade of every pixel based on the print head temperature and current shade value. The printhead temperature is known from a temperature sensor that senses the temperature and provides temperature data to the printer controller 24. The pixel shade to be printed for each pixel is known from the print data provided to the printer controller 24. Lower density pixel shades (such as 25% or lower) need less energy applied to the heating elements of the print head to transfer dye as the printhead temperature increases. Higher density pixel shades (such as 75% or higher) need less energy applied to the heating elements to transfer dye as the printhead temperature increases, but at a different rate than lower density pixel shades.

By compensating for both printhead temperature and pixel density, a tighter tolerance of the resulting printed pixel densities is achieved. For example, in one embodiment, the compensation scheme described herein can result in a pixel density error (i.e. deviation of the actual pixel density after printing from a target pixel density) of about ±8.0% over all pixel densities; about ±4.0% or less at pixel densities at and above 40%; or about ±2.0% at pixel densities at and above 70%. In this example, the density measurements were obtained from 10 plastic cards printed in a plastic card printer with a thermal printhead using the compensation scheme described herein, at printhead temperatures from about 17 C to about 70 C, and are accurate to 0.01 density units measured using an XRite i1Pro Spectrophotemeter available from X-Rite, Inc. of Grand Rapids, Michigan The plastic card printer used to print the 10 plastic cards was a Sigma DS3 desktop card printer from Entrust Corporation of Shakopee, Minnesota. In contrast, in plastic card printing systems without the described compensation scheme, density errors as high as 40% at lower pixel densities and density errors of 20% or more at higher pixel densities are often encountered.

The described compensation scheme requires significant data processing. Conventional printing systems employing conventional data processing mechanisms will be slowed down by the data processing requirements, thereby significantly decreasing the card printing rate and the overall card throughput of the card printing system.

The printer controller 24 is therefore provided with one or more data processing devices that can handle the increased data processing requirements. Preferably, in order to maintain a print speed from about 0.38 inches per second up to about 1.75 inches per second, or a print speed of about 1.55 inches per second, the printer controller 24 is preferably provided with one or more data processing devices that have a data processing speed of at least about 96 MHz or greater. The one or more data processing devices can be any type of device(s) suitable to achieve at least this data processing speed. For example, in one embodiment, the one or more data processing devices can include a FPGA. However, the data processing device(s) can be single core or multi-core processors or other data processing devices. However, if a lower print speed is acceptable, a data processing device(s) with a lower data processing speed can be used while still compensating for both the printhead temperature and the pixel density.

The compensation scheme that is used can vary based on a number of variables, including the temperature of the printhead. For example, in one embodiment, if the temperature of the printhead is less than a minimum operating temperature of 15 C, the following compensation equation can be used:

$$\text{Strobe Pulse Length} = \frac{\left(CAL - \frac{((TComp \cdot CAL)\%2^{50})}{2^{34}}\right)}{\text{CLOCK } FREQ}$$

TComp=change of energy applied to the printhead/change of print head temperature.

CAL=worst case strobe pulse length, in terms of clock frequency (for example, with a clock frequency of about 96 MHz, CAL has a resolution of about 10.4 nanoseconds)

Clock Freq=the clock frequency of the data processing device such as the FPGA

Strobe Pulse Length=energy applied to the print head in seconds.

In another embodiment, if the temperature of the printhead is above the minimum operating temperature of 15 C, and the equation (2*TComp−DComp*(ShadeIndex−ShadeIndexZero)>0) is true, then the following compensation equation can be used:

$$\text{Strobe Pulse Length} = \frac{\left(CAL - \frac{((((TPH_{Temp} - TcompZeroTemp) * (2 * TComp - DComp * (ShadeIndex - ShadeIndexZero))) * CAL)\%2^{50})}{2^{34}}\right)}{\text{CLOCK } FREQ}$$

TPHTemp=a measured value of the current print head temperature.

TCompTempZero=minimum operating temperature of the printer.

ShadeIndex=current shade of the pixel being printed.

ShadeIndexZero=minimum shade to start adding density compensation.

TComp=change of energy applied to the printhead/change of print head temperature.

DComp=change of energy/change of targeted print density.

CAL=worst case strobe pulse length, in terms of clock frequency (for example, with a clock frequency of about 96 MHz, CAL has a resolution of about 10.4 nanoseconds)

Clock Freq=the clock frequency of the data processing device such as the FPGA

Strobe Pulse Length=energy applied to the print head in seconds.

Conversely, if the temperature of the printhead is above the minimum operating temperature of 15 C, and the equation (2*TComp−DComp*(ShadeIndex−ShadeIndexZero)>0) is false, then the following compensation equation can be used:

$$\text{Strobe Pulse Length} = \frac{CAL}{\text{CLOCK } FREQ}$$

CAL=worst case strobe pulse length, in terms of clock frequency (for example, with a clock frequency of about 96 MHz, CAL has a resolution of about 10.4 nanoseconds)

Clock Freq=the clock frequency of the data processing device such as the FPGA

Strobe Pulse Length=energy applied to the print head in seconds.

Figure 3:
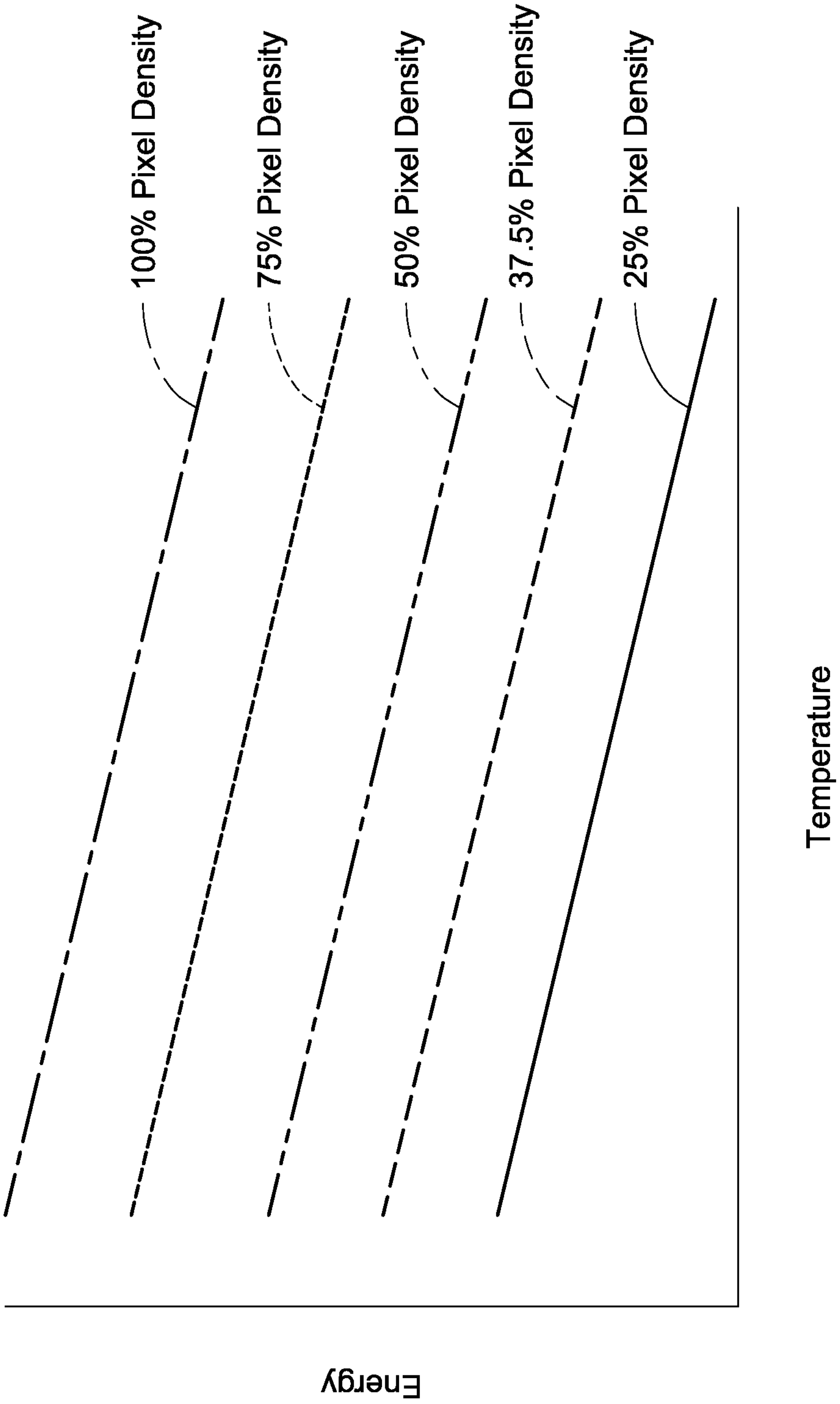
FIG. 3 illustrates an example plot of energy applied to the heating elements of the thermal printhead versus the temperature of the printhead for various pixel density levels.

Referring to FIG. 3, an example of compensating for both printhead temperature and pixel density when energizing each heating element using adjusted strobe pulses is illustrated. FIG. 3 depicts plots of energy (i.e. the strobe pulses) applied to the heating elements of the thermal printhead versus the temperature of the printhead for various pixel density levels. As depicted, the plots are generally parallel to each other. In conventional plots without the compensation scheme described herein, the plots would tend to converge toward one another and ultimately merge as the printhead temperature increases.

Figure 4:
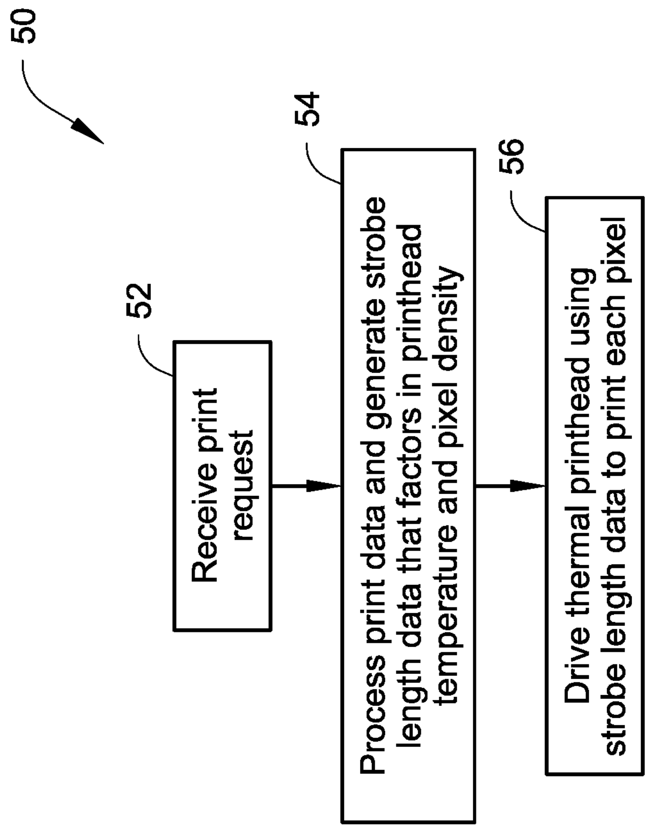
FIG. 4 illustrates an example of a method described herein that compensates for both the printhead temperature and the pixel density.

FIG. 4 illustrates a method 50 that uses the compensation scheme described herein. In the method 50, a print request is received 52 by the printer controller. In one embodiment, the print request 52 can include print data for the printing that is to be performed by the printing system 10, 100. In another embodiment, the print request 52 can cause the printer controller to retrieve print data from a data storage location. At step 54, the print data is then processed using the compensation scheme described herein and, for each pixel to be printed, the strobe pulse length is determined that is adjusted for both the current printhead temperature and the density of the pixel to be printed. At step 56, the strobe pulses are used to drive the heating elements of the thermal printhead to perform the printing. In one embodiment, for each print job, the data can be processed simultaneously with driving the thermal printhead (i.e. the thermal printhead can be driven with a set of calculated strobe pulse lengths for a portion of the print job while new strobe pulse length data for another portion of the print job is being determined). In another embodiment, all of the strobe pulse length data for the entire print job can first be determined, followed by using the determined strobe pulse length data to drive the thermal printhead to perform the print job.

The printing systems 10, 100 described herein can be utilized in lower volume desktop card processing systems or in large volume batch production card processing systems (or central issuance processing systems). Desktop card processing systems are typically designed for relatively smaller scale, individual card personalization in relatively small volumes, for example measured in tens or low hundreds per hour. In these mechanisms, a single plastic card to be personalized is input into a card processing system, which typically includes one or two processing capabilities, such as printing and laminating. These processing machines are often termed desktop processing machines because they have a relatively small footprint intended to permit the processing machine to reside on a desktop. Many examples of desktop processing machines are known, such as the SD or CD family of desktop card printers available from Entrust Corporation of Shakopee, Minnesota Other examples of desktop processing machines are disclosed in U.S. Pat. Nos. 7,434,728 and 7,398,972, each of which is incorporated herein by reference in its entirety.

For large volume batch processing of personalized plastic cards (for example, on the order of high hundreds or thousands per hour), institutions often utilize card processing systems that employ multiple processing stations or modules to process multiple cards at the same time to reduce the overall per card processing time. Examples of such machines include the MX and MPR family of central issuance processing machines available from Entrust Corporation of Shakopee, Minnesota Other examples of central issuance processing machines are disclosed in U.S. Pat. Nos. 4,825,054, 5,266,781, 6,783,067, and 6,902,107, all of which are incorporated herein by reference in their entirety.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A plastic card printing system that prints on a plastic card, comprising:

a print ribbon supply and a print ribbon take-up;

a multicolor print ribbon supplied from the print ribbon supply and taken up on the print ribbon take-up, the multicolor print ribbon includes a plurality of dye color panels;

a thermal printhead having a plurality of individually energizable heating elements;

a printer controller in communication with the thermal printhead and that generates data to control the energization of the individually energizable heating elements to print an image to be applied to the plastic card; for each pixel to be printed, the printer controller generates data to control the energization of the individually energizable heating elements based on a temperature of the thermal printhead and a density of the pixel.

2. The plastic card printing system of claim 1, wherein the dye color panels include cyan, magenta and yellow color panels.

3. The plastic card printing system of claim 1, wherein the multicolor print ribbon includes a plurality of black pigment panels and a plurality of topcoat panels.

4. The plastic card printing system of claim 1, wherein the printer controller includes a field programmable gate array.

5. The plastic card printing system of claim 1, wherein the thermal printhead is part of a plastic card printer, and the printer controller is part of the plastic card printer.

6. The plastic card printing system of claim 1, wherein the thermal printhead is part of a plastic card printer, and the printer controller is remote from the plastic card printer.

7. The plastic card printing system of claim 1, wherein the plastic card printing system has a pixel density error of 8% or less across all pixel densities.

8. A plastic card printing system, comprising:

a print ribbon supply and a print ribbon take-up;

a multicolor print ribbon supplied from the print ribbon supply and taken up on the print ribbon take-up, the multicolor print ribbon includes a plurality of dye color panels;

a thermal printhead having a plurality of individually energizable heating elements;

a printer controller in communication with the thermal printhead and that generates data to control the energization of the individually energizable heating elements to print an image to be applied to the plastic card; and the printer controller includes at least one field programmable gate array having a data processing speed of at least about 96 MHz.

9. The plastic card printing system of claim 8, wherein the thermal printhead is part of a plastic card printer, and the printer controller is part of the plastic card printer.

10. The plastic card printing system of claim 8, wherein the thermal printhead is part of a plastic card printer, and the printer controller is remote from the plastic card printer.

11. The plastic card printing system of claim 8, wherein the dye color panels include cyan, magenta and yellow color panels.

12. The plastic card printing system of claim 8, wherein the multicolor print ribbon includes a plurality of black pigment panels and a plurality of topcoat panels.

13. The plastic card printing system of claim 8, wherein the plastic card printing system has a pixel density error of 8% or less across all pixel densities.

14. A method of direct-to-card thermal printing on a plastic card in a plastic card printing system having a thermal printhead with a plurality of individually energizable heating elements, and a multicolor print ribbon that includes a plurality of dye color panels, the method comprising:

receiving a print request for printing on the plastic card in the plastic card printing system using the thermal printhead and the multicolor print ribbon, the print request including print data;

processing the print data to, for each pixel to be printed, generate strobe pulse length data used to energize the individually energizable heating elements, where the strobe pulse length data for each pixel factors in a temperature of the thermal printhead and a density of the pixel; and using the generated strobe pulse length data for each pixel to energize the individually energizable heating elements to transfer dye from the dye color panels and print on the plastic card.

15. The method of claim 14, wherein the dye color panels include cyan, magenta and yellow color panels.

16. The method of claim 14, wherein the multicolor print ribbon includes a plurality of black pigment panels and a plurality of topcoat panels, and comprising using some of the generated strobe pulse length data to energize the individually energizable heating elements to transfer black pigment from one of the black pigment panels to the plastic card and/or to transfer topcoat material from one of the topcoat panels to the plastic card.

17. The method of claim 14, comprising processing the print data using a field programmable gate array.

18. The method of claim 14, wherein the plastic card printing system has a pixel density error of 8% or less across all pixel densities.

19. The method of claim 14, wherein the thermal printhead is part of a plastic card printer, and wherein the processing of the data occurs on the plastic card printer.

20. The method of claim 14, wherein the thermal printhead is part of a plastic card printer, and wherein the processing of the data occurs remote from the plastic card printer.

* * * * *